May 19, 1959

V. L. FRANTZ 2,887,126

SOLENOID VALVE PLUNGER

Filed May 21, 1957

INVENTOR
VIRGIL L. FRANTZ

BY *Wilmer Mechlin*

ATTORNEY

United States Patent Office 2,887,126
Patented May 19, 1959

2,887,126

SOLENOID VALVE PLUNGER

Virgil L. Frantz, Salem, Va., assignor to Graham-White Sales Corp., Salem, Va., a corporation of Virginia Application May 21, 1957, Serial No. 660,586

8 Claims. (Cl. 137—625.27)

This invention relates to solenoid valves and particularly to plungers for such valves.

Widely used in regulating airflow as either pilot or main valves, solenoid valves conventionally have a spring-loaded plunger which normally is held in open or closed position by the spring and is shifted to the opposite position by actuation of the solenoid. In such a valve, the plunger itself must be adapted to seat against and close a valve seat and at the same time must be made of a metal responsive to the magnetic flux. A machined surface providing a poor air seal under the relatively low pressure exertable by the solenoid or the counteracting spring, attempts were made to employ rubber as the sealing medium. The difficulty was that neither any available adhesive nor injection molding proved effective to bond the rubber permanently to an end of the plunger and the one means of attachment found effective, molding the rubber as a threaded plug and securing it into a correspondingly threaded hole in the end of the plunger, resulted in a high rate of rejections. An additional difficulty was that when, as generally is the case, the valve is to operate as a three-way valve, the axially extending slots machined into the cylindrically surfaced side of the plunger to permit passage of air therepast had so little free area as to become plugged in a relatively short time by sludge or other gummy deposits. These difficulties together necessitated frequent overhaul of solenoid valves and that with the rubber made it impossible to repair the plunger in the field and required its replacement.

The primary object of the present invention is to provide a solenoid valve plunger which avoids the difficulty heretofore experienced in securing rubber in an end of the plunger.

Another object of the invention is to provide a solenoid valve plunger of such arrangement and construction as to carry at either or both ends a rubber pad for seating against an associated valve seat, the pad being secure against dislodgment in operation and readily removable from the plunger for reversal or replacement when worn.

An additional object of the invention is to provide a solenoid valve plunger which not only carries a readily removable rubber pad at an end for seating against an associated valve seat, but has its body so formed at the side as to provide substantially non-clogging exterior passages for flow of air therepast without detriment to guidance of the plunger within the coil.

A further object of the invention is to provide a solenoid valve plunger of multi-part construction wherein one or more rubber pads for closing its ends are carried in the interior of the plunger and a removable cap closing one end of the interior provides an outstanding flange for engagement by the loading spring.

Another object of the invention is to provide a take-down plunger for a solenoid valve, which is of simple and rugged construction and the parts of which are readily made from standard stock.

Other objects and advantages will appear hereafter in the detailed description, be particularly pointed out in the appended claims and be illustrated in the accompanying drawings, in which:

Figure 1:
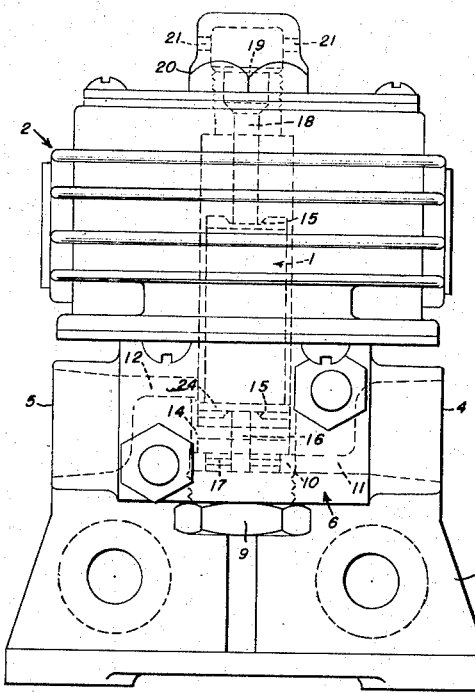
Figure 1 is an end elevational view of a solenoid valve incorporating a preferred embodiment of the plunger of the present invention.
Figure 3:
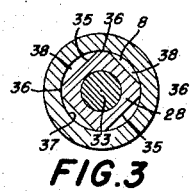
Figure 3 is a horizontal sectional view taken along the lines 3—3 of Figure 2.
Figure 4:
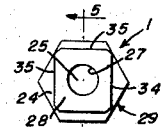
Figure 4 is a top plan view of the plunger removed from the valve.
Figure 5:
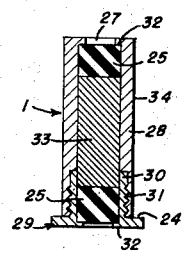
Figure 5 is a vertical sectional view taken along the lines 5—5 of Figure 4.
Figures 2, 6:
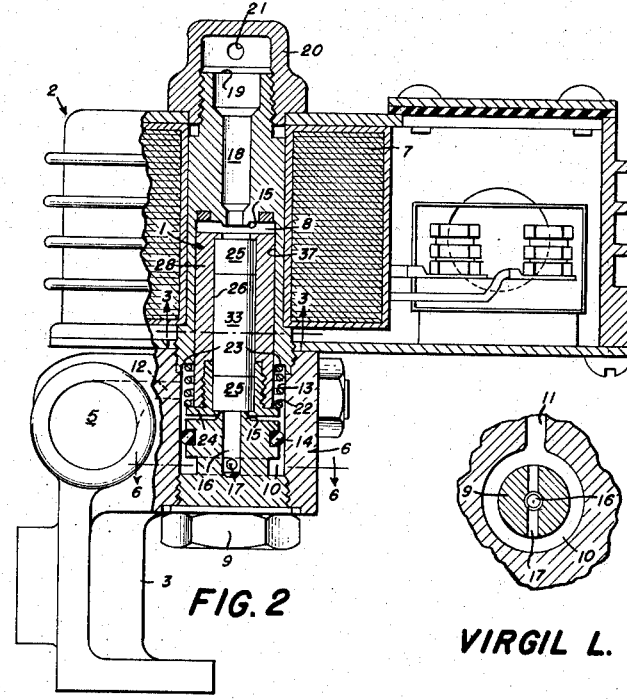
Figure 2 is a side elevational view of the valve of Figure 1 with portions broken away and shown in section to more clearly illustrate certain of the details of construction.
Figure 6 is a fragmentary horizontal sectional view taken along the lines 6—6 of Figure 2.

Referring now in detail to the drawings, in which like reference characters designate like parts, the solenoid valve plunger of the present invention, designated as 1, while employable in general in solenoid valves in which a valve seat alternately is engaged and disengaged by a solenoid-actuated plunger for regulating passage of fluid therethrough, has been applied for purposes of illustration to a three-way solenoid valve 2.

In the form shown, the solenoid valve 2 has a mounting bracket 3 attachable to a suitable base (not shown) in which are formed a pair of spaced ports, one here serving as an inlet port 4, and the other as an outlet port 5. Removably attached to a side of the upper portion of the bracket 3 as by bolting is a housing 6 carrying a solenoid 7 and housing a substantially cylindrical, vertically directed valve chamber 8 in which slides or reciprocates the plunger 1. The lower end of the chamber 8 is closed by a plug 9 threaded into the housing 6 below the chamber and having intermediate its ends a peripheral annular groove 10 which is open through registering passages 11 in the housing 6 and bracket 3 to the inlet port 4. The outlet port in turn is connected through registering passages 12 in the bracket 3 and housing 6 to the valve chamber 8 intermediate the ends thereof and, specifically, to an enlarged lower end portion 13 of the valve chamber 8 which conveniently is sealed from the annular groove 10 by an intermediate O-ring 14 carried by the plug 9.

At opposite ends of the valve chamber 8 are a pair of vertically or axially spaced valve seats 15 each preferably in the form of a frusto-conical tip projecting or instanding toward each other into the valve chamber. The lower of the frusto-conical valve seats 15 encircles or embraces the upper end of a recess 16 extending axially into the plug 9 to the level of the annular groove 10 and connected thereto through radial openings 17. The valve seat 15 at the opposite or upper end of the valve chamber 8 encircles or embraces a way 18 extending thereabove through the upper portion of the housing 6 to a third port 19. Depending on the use to which the solenoid valve 2 is to be applied, the upwardly facing third port 19 at the upper end of the housing 6 may serve as an inlet or an outlet or, as here, as an exhaust port, in such case being covered or protected by an exhaust nut 20 and exhausting to atmosphere through radial openings 21 in the nut.

With the ports 4, 5 and 19 here arranged respectively as inlet, outlet and exhaust, the illustrated solenoid valve 2 is designed to operate as a normally closed valve with the lower of the valve seats 15, through which the inlet and outlet ports 4 and 5 are connectable, normally closed by one end of the plunger 1. The plunger 1 is spring-loaded to hold it in that position, the loading or return spring means here being in the form of a coil spring 22 contained in the enlarged lower end portion 13 of the chamber 8, the loading spring 22 acting between a shoulder 23 defining the upper extremity of the enlarged portion of the chamber and a peripheral lip or flange 24 extending radially or outstanding from the plunger 1.

Intended normally to close the lower of the valve seats 15 and block access between the inlet and outlet ports 4 and 5 and to be shifted therefrom against the force of the loading spring 22 on actuation of the solenoid 7 to open the inlet port 4 to the outlet port 5 and at the same time, by seating against the upper of the valve seats 15, to block access between the outlet and exhaust ports 5 and 19, the plunger 1 of the preferred embodiment carries at either end a rubber pad, disc or plug 25 through which it is adapted sealingly to engage the valve seats 15 in alternation. Unlike solenoid valve plungers heretofore proposed, the plunger 1 of this invention carries internally its pad or pads 25 of rubber or like resilient or yieldable material, hereinafter termed generally "rubber," in an axial or central bore or cavity 26 extending axially substantially the length of the plunger. The bore is confined at opposite ends to contain the rubber pad or pads 25 but opens onto one or, as here, each end of the plunger through a relatively restricted aperture or opening 27 preferably substantially coaxial or vertically aligned with the bore and of a cross-sectional area less than the bore but sufficient to pass the confronting of the valve seats 15.

Of multi-part construction to permit insertion of a rubber pad or pads into its bore 26, the plunger 1 is comprised of a body or casing 28 capped at one, here its lower, end by a removable cap or closure member 29 threadedly engaging or otherwise removably attached to the body and partly or, if there is no valve seat at that end of the valve chamber 8, fully closing its end of the bore 26. In the illustrated embodiment, the cap 29 has a flanged outer end which is of greater cross-section than and extends or projects radially beyond the body 28 to provide the aforementioned lip or flange 24 on the plunger, against which the loading spring 22 reacts. The cap also has an externally threaded stem or neck portion 30 integral with and upstanding from its flange or flanged outer end 24, which is threadable into an internally threaded socket 31 in the lower end of the body 28 and contains the lower part of the preferred substantially cylindrical, uniform cross-section bore 26, the balance of the latter being contained thereabove in the body 28. With this construction, the end walls 32 of the body 28 and cap 29 forming the opposite ends of the plunger 1 and confining the ends of the bore 26, conveniently may be bored or drilled to form the restricted apertures 27, the body and the stem 30 of the cap then being counterbored to form their respective parts of the cylindrical bore 26. Whether formed in this or other manner, the axial bore 26 will have a stop or abutment in the form of the end walls 32 and one or each of the latter will be interrupted centrally by a relatively restricted aperture 27.

It has been mentioned that two or a plurality of the rubber pads 25 are employed when the plunger 1 is to close a valve seat at either end. While conceivably a single pad extending the length of the bore 26 could be employed for the same purpose, this would present difficulty when, as in the disclosed embodiment, two parts of the bore are rotated relatively in assembling and disassembling the plunger, because of the resistance of the rubber to such rotation in the absence of lateral play between the rubber and the bore. It therefore is preferred in such case to employ two rubber plugs, one contained entirely within the portion of the bore in each of the body 28 and cap 29, and to space the pads 25 axially by a rigid spacer 33, which for the preferred cylindrical bore 26 and pads 25, as well may be cylindrical. It also is preferred that the combined longitudinal or axial dimension of the plugs 25 and spacer 33 relative to that of the bore 26 be such that the plugs will be under initial compression or precompressed and pressed or urged into axial engagement with the end walls 32 when the cap 29 is screwed tight into the body 28. Too, while the rubber pads might have reduced end portions adapted to project through the restricted end apertures 27 for engaging the valve seats 15, it is here contemplated for the valve seats to extend or project into the apertures sufficiently to contact and be sealed by the rubber pads. To this end, the thickness of the end walls 32 interrupted by the apertures 27, relative to the projection of the frusto-conical seats 15 into the ends of the valve chamber 8, is such as to ensure the desired seating within or internally of the ends of the plunger.

Constructed in the above manner, the plunger 1, if the presented or seat-engaging face of either of its rubber pads 25 becomes worn, is readily adapted for repair in the field. If the wear is restricted to one face of either plug, the repair simply entails removing the plug 9 closing the lower end of the valve chamber 8, if necessary first detaching the housing 6 from the bracket 3, whereupon the plunger will drop out of the valve chamber. By then removing the cap 29 from the body 28, the worn rubber plug may simply be reversed to present an unworn face for engagement with the associated valve seat. If the wear is greater, either or both of the rubber plugs may be replaced in toto, but since removably seated in the plunger and not bonded or otherwise fixed thereto, such replacement in the field is a simple matter.

An important feature of the plunger 1 of the present invention, when applied as in the disclosed embodiment to a three-way solenoid valve, is its side construction by which the plunger is guided effectively in its reciprocable movement in the valve chamber 8 and provided with substantially non-clogging passageways for flow of air past the plunger between the ports 5 and 19, which open at spaced stations onto the valve chamber 8. As will be noted, the plunger 1 has a shank 34 which, instead of being cylindrical as are those of conventional plungers, preferably is substantially square or rectangular in cross-section with its sides or side walls 35 substantially flat or planar and only rounded at the axially extending corners or corner surfaces 36 connecting the contiguous marginal edges of the side walls 36. Swung about the longitudinal axis of the plunger 1 and substantially coradial with or of the same radius as the cylindrical side wall 37 of the valve chamber 8, these rounded or arcuately convex corners or lands 36 afford surface contact between the chamber and the plunger at the corners of the latter for both centering and guiding the plunger in the chamber. At the same time, there is provided, between each of the axially extending substantially flat or chordal side walls 35 of the plunger and the cylindrical inner wall 37 of the valve chamber, a segmental passage or passageway 38 which is segment-shaped in cross-section. Spaced at the sides by the lands 36, the passages 38 are of such large cross-section, relative to the axial grooves of conventional plungers, as to both drastically reduce the extent to which sludge is deposited by minimizing turbulence and practically inhibit interference with flow of air by any sludge that does deposit on the sides of the passages.

To avoid the nicety in manufacture that would otherwise be required to ensure alignment of the upper and lower parts of its side walls 35, the shank 34 of the plunger is formed entirely on its body 28, with only the radially projecting flange 24 carried by the cap 29. The rounded or arcuately convex lands 36 also serve in the enlarged lower portion 13 of the chamber 8 to center the loading spring 22 relative to both the plunger 1 and the chamber 8. In keeping with the preferred configuration of the shank 34 of the plunger 1 or its body 28, the flange 24, while projecting sufficiently beyond the shank to afford bearing for the loading spring 22, is of hex or like section to facilitate assembly and disassembly of the plunger.

The plunger 1 of the preferred construction not only improves the operation of a solenoid valve and simplifies repairs but is readily produced on automatic machinery from standard stock. Thus, the body 28 and cap 29 may be made from square and hex stock, respectively, while the rubber pads 25 and spacer 33 may be cut from round stock. It should be understood that the described and disclosed embodiment is merely exemplary of the invention and that all modifications are intended to be included which do not depart from either the spirit of the invention or the scope of the appended claims.

Having described my invention, I claim:

1. A solenoid valve plunger comprising a body member, a bore extending axially of and confined at one end by said body member, a cap member removably attached to said body member and confining the other end of said bore, said bore opening onto said one end of said plunger through a relatively restricted aperture in said body member, and rubber means in said bore and engaging said body member about said aperture for sealingly engaging a valve seat.

2. A solenoid valve plunger comprising a body member, a bore extending axially of and confined at one end by said body member, a cap member removably attached to said body member and confining the other end of said bore, said bore opening onto opposite ends of said plunger through a relatively restricted aperture in each of said members, and rubber means in said bore and engaging said members about said apertures for sealingly engaging spaced valve seats in alternation.

3. A solenoid valve plunger comprising a body member, a bore extending axially of and confined at one end by said body member, a cap member removably attached to said body member and confining the other end of said bore, said bore opening onto an end of said plunger through a relatively restricted aperture in one of said members, rubber means in said bore, and means in said bore and pressing said rubber means axially against said one member about said aperture for sealingly engaging a valve seat.

4. A solenoid valve plunger comprising a body member, a bore extending axially of and confined at one end by said body member, a cap member removably attached to said body member and confining the other end of said bore, said bore opening onto opposite ends of said plunger through a relatively restricted aperture in each of said members, a plurality of rubber pads in said bore and each engaging one of said members about the aperture therein, and rigid means in said bore and axially spacing said rubber pads for urging each into said engagement, said rubber pads being alternately engageable each with one of a plurality of valve seats on reciprocation of said plunger.

5. In a spring-loaded solenoid valve, a plunger comprising a body member, a bore extending axially of and confined at one end by said body member, a cap member threaded into an end of said body member and confining the other end of said bore, said bore opening onto opposite ends of said plunger through a relatively restricted aperture in each of said members, a flange on said cap member and projecting radially beyond said body member for seating an end of a loading spring, and rubber means in said bore and engaging said members about said apertures for sealingly engaging spaced valve seats in alternation.

6. In a spring-loaded solenoid valve, a plunger comprising a body member, a cap member having a stem portion threaded into an end of said body member and a peripheral flange projecting radially outwardly of said body member, an axial bore in said body member extending into said stem and confined at opposite ends by said members, said bore opening onto ends of said plunger through axially aligned relatively restricted apertures each in one of said members, a plurality of rubber pads in said bore each contained within one of said members, and spacer means in said bore axially spacing and urging each of said rubber pads into axial engagement with one of said members about the aperture therein, said rubber pads being alternately engageable each with one of a plurality of valve seats on reciprocation of said plunger.

7. In a spring-loaded solenoid valve, a plunger comprising a body member substantially rectangular in cross-section and having substantially flat side walls, coradial arcuate surfaces on said body member connecting contiguous marginal edges of said side walls, a cap member threaded into an end of said body member and having a peripheral flange extending radially beyond said surfaces thereon for engaging an end of a loading spring, a substantially cylindrical bore in and extending axially of said body member and confined at opposite ends by said members, said bore opening onto opposite ends of said plunger through coaxial relatively restricted apertures one in each of said members, a pair of substantially cylindrical rubber pads removably seated within said bore and each axially engaging one of said members about the aperture therein, and substantially cylindrical spacer means removably seated within said bore between and axially spacing said pads for urging each of said pads into said engagement.

8. In a spring-loaded solenoid valve, a plunger comprising a body member substantially rectangular in cross-section and having substantially flat side walls, coradial arcuate surfaces on said body member connecting contiguous marginal edges of said side walls, a cap member having a stem threaded into an end of said body member and a peripheral flange projecting radially beyond said surfaces for engaging an end of a loading spring, a substantially cylindrical axial bore in said body member and extending into said stem and confined at ends by said members, said bore opening onto opposite ends of said plunger through coaxial relatively restricted apertures one in each of said members, a plurality of rubber pads in said bore each removably seated in and contained by one of said members and axially engaging said member about the aperture therein, and a substantially cylindrical rigid spacer removably seated in said bore between and axially spacing said pads for urging said pads into said engagement.

References Cited in the file of this patent

UNITED STATES PATENTS

| | | |
|---|---|---|
| 555,307 | Denayrouze | Feb. 25, 1896 |
| 2,041,416 | Johnson | May 19, 1936 |
| 2,614,584 | Goepfrich | Oct. 21, 1952 |
| 2,624,585 | Churchill et al. | Jan. 6, 1953 |
| 2,710,162 | Snoddy | June 7, 1955 |
| 2,820,604 | Ray | Jan. 21, 1958 |